March 24, 1964   W. L. HORIGAN, JR   3,125,805
CLADDING FERROUS-BASE ALLOYS WITH TITANIUM
Filed July 22, 1959

WITNESSES:
Bernard R. Gieguen
H M Snyder

INVENTOR
Walter L. Horigan, Jr.
BY
Frederick Shopor
ATTORNEY

United States Patent Office 3,125,805
Patented Mar. 24, 1964

3,125,805
CLADDING FERROUS-BASE ALLOYS WITH TITANIUM
Walter L. Horigan, Jr., Monroeville, Pa., assignor to Westinghouse Electric Corporation, East Pittsburgh, Pa., a corporation of Pennsylvania
Filed July 22, 1959, Ser. No. 828,912
4 Claims. (Cl. 29—492)

This invention relates to improvements in the cladding of ferrous-base alloys, and in particular is directed to the cladding of stainless steel with titanium.

The cladding of ferrous-base alloys with other metals having properties desired for particular application is much practiced in the art, because ferrous-base alloys offer a relatively inexpensive base material having good structural and fabrication properties. Thus, stainless steel has been clad with nickel and with copper.

One especially attractive combination would be stainless steel clad with titanium, but this has not been satisfactorily accomplished. Pure titanium has outstanding corrosion resistance in environments such as plain water, sea water, and dilute and concentrated nitric acid, but it is, compared to stainless steel, an expensive material and does not meet strength requirements in some applications. On the other hand, stainless steel is relatively inexpensive compared with titanium and meets mechanical property specifications for many structural components. Titanium alloyed with small amounts of other metals also exhibits unique properties and would be desirable for cladding applications.

A composite member comprising a layer of titanium having a thickness adequate to meet the requirements of corrosion resistance which is metallurgically bonded to a steel base to satisfy the strength requirements of structural components, offers interesting possibilities for application in a nuclear reactor, in chemical apparatus, and other applications. A metallurgical bond is specified because with such a bond optimum heat transfer as well as the ability to withstand deformation without failure is secured.

Titanium clad austenitic stainless steel is particularly desired for use as a structural material in a homogeneous reactor where heavy corrosive slurries must be pumped through tanks and conduits, at elevated temperature and pressure. The corrosion resistance of titanium tends to eliminate one source of contamination of the liquid moderator in the reactor and thus simplifies the purification process required before recirculation of the moderator.

Several methods for cladding stainless steel with titanium have been tried and found wanting in the past. Cold rolled cladding was one of the processes which was not successful, even where only thin sections were involved, for the reason that austenitic stainless steel work hardens rapidly, and thereby limits the amount of cold reduction that can be applied. The amount of cold reduction permissible is not enough to allow sufficient force to be applied to form a good bond between the stainless steel and the titanium.

In the fusion bonding process, in which a silver manganese brazing alloy is used and the process is conducted under vacuum, bonds were formed, which, however, failed upon subsequent hot or cold deformation.

Hot roll cladding has also been attempted with rolling temperatures in the range 930° C. to 1200° C. It has been found that in this temperature range the iron or nickel of the stainless steel reacts excessively with the titanium to form either a liquid eutectic layer or brittle intermetallic compounds. Continuous bonds could not be formed by this process.

It is the object of this invention to provide a method for producing a continuously bonded titanium clad ferrous member having good ductility and heat transfer properties in which a ferrous alloy plate is metallurgically bonded by hot rolling to a titanium metal plate through a thin intervening chromium barrier layer.

It is a further object of this invention to provide a composite titanium clad austenitic stainless steel member havng a barrier layer of chromium between a titanium plate and a stainless steel plate.

Other objects and advantages of the invention will become apparent hereinafter.

For a better understanding of the nature and objects of the invention, reference should be had to the following detailed description and to the drawing, in which.

Figure 1:
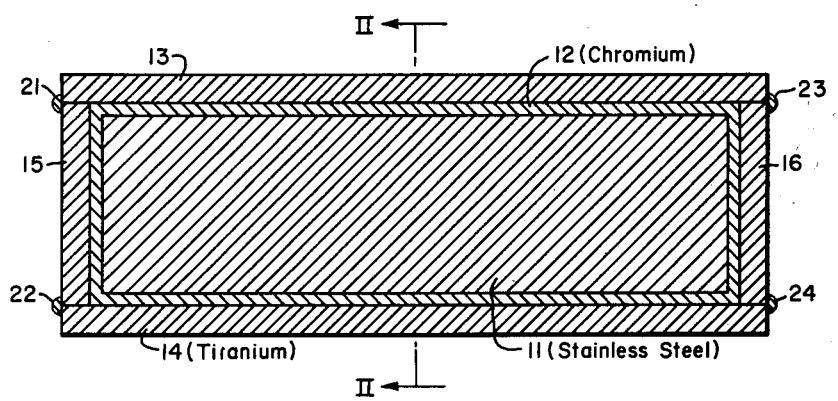
FIGURE 1 is a sectional view of a titanium and stainless steel assembly.

This invention relates to a novel method for cladding a ferrous metal alloy member with a layer of titanium metal by providing a thin intermediate barrier layer to provide a novel composite member having many desired properties. The novel method comprises applying a thin barrier of chromium to the ferrous metal alloy member, superposing plates of titanium metal in intimate engagement with the barrier layer, deoxidizing the assembly, and hot rolling the assembly above a selected temperature to metallurgically bond the titanium to the chromium barrier layer and to the ferrous alloy member. This process is particularly adapted for use with austenitic alloys which harden excessively on cold working; the hot rolling of the assembly is performed at a temperature at which the austenitic alloy does not work harden significantly.

The ferrous alloy is preferably austenitic, but may be ferritic, or martensitic stainless steel, iron-aluminum alloys containing up to 10% aluminum, and high temperature iron-base alloys containing nickel and chromium additives; for example, an alloy comprising 26% nickel, 13.5% chromium, molybdenum 3.0%, titanium 1.6%, the balance iron except for a total of less than 2% of silicon, manganese, aluminum and iron. Titanium alloys containing small amounts of aluminum and chromium may be used as the cladding material as well as pure titanium.

Specific reference will be made to a method for cladding an 18–8 austenitic stainless steel with titanium using a thin intermediate barrier layer of chromium. In this specific method, (1) a thin chromium barrier layer having a thickness of from 0.0005 to 0.005 inch is first applied to a stainless steel plate, (2) then a corrosion resistant layer comprising a titanium plate or plates is applied and secured in intimate engagement with the chromium barrier layer, (3) the composite assembly is annealed in a suitable atmosphere to promote the removal of oxide from the surface of the titanium, (4) the assembly is hot rolled at a temperature from 9300 C. to 1200° C. to metallurgically bond the stainless steel and titanium plates through the chromium barrier layer, and (5) lastly, the assembly is cooled.

The barrier layer of chromium may be provided by a plating process from a standard chromium bath. For example, one suitable bath comprises 33 ounces per gallon of chromic acid and 0.3 ounce per gallon of sulphate ($SO_4$) introduced as sulfuric acid, using a current density of about 2 amperes per square inch of plating area. Other details of the plating process are well known in the art, and, since they form no part of the present invention will not be further discussed here.

The following basic requirements underlie the successful practice of the method in accordance with this invention:

(1) The mating surfaces of the titanium and stainless steel plates must be clean and free from oxide and must be maintained as free as possible from oxide during the cladding operation, and the assembly annealed at an elevated temperature to diffuse any traces of oxides at the surfaces into the body of the metal plates.

(2) The composite member must be subjected to reduction in thickness of at least 70%, and preferably over 75%, during the hot rolling operation.

(3) The mating surfaces must be of compositions that do not form brittle or low melting eutectic compounds upon alloying during cladding while heated.

FIGURE 1 shows the several elements which make up a composite stainless steel titanium clad member in assembled relation prior to the bonding treatment. The assembly 1 comprises a stainless steel plate 11 which has had its entire surface area plated with a chromium layer 12 (the thickness of the chromium layer is exaggerated in FIG. 1). The chromium plated stainless steel plate 2 is sandwiched between a pair of titanium plates 13 and 14, respectively. So that the edge of the stainless steel plate may be clad, titanium plates 13 and 14 overlap the stainless steel plate and edging bars 15 and 16 of titanium abut the stainless steel plate at the edges thereof, and are also sandwiched between titanium plates 13 and 14. With the elements of the member in this position, the seams between adjoining titanium members are welded together by fusion welds at joints 21, 22, 23 and 24.

Figure 2:
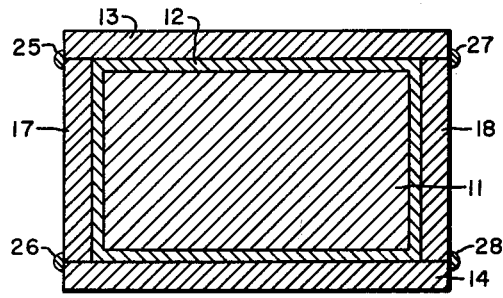
FIG. 2 is a view taken along the line II—II of FIG. 1.

In FIG. 2 it is seen that the front and back edges of the stainless steel plate 11 abut titanium edging bars 17 and 18 which are also sandwiched between titanium plates 13 and 14. The bars 17 and 18 are secured to the plates 13 and 14 by the fusion weld points 25, 26, 27 and 28.

The welding of the titanium plates and bars at their junctures produces a substantially gas-tight enclosure for steel plate 11.

An actual example of a cladding operation performed in accordance with this invention will now be described. The ferrous alloy base was an 18–8 (18% chromium–8% nickel) stainless plate of a thickness of 0.250 inch and the titanium plate was commercially pure metal of a thickness of 0.250 inch. The various elements which comprise the composite assembly; i.e., the stainless steel plate, the titanium plates, and the titanium bars, were all carefully machined so that the mating surfaces of the titanium and stainless steel elements closely conformed to each other when assembled. The stainless steel plate was first carefully degreased and cleaned, and then plated with a .002 inch layer of chromium in a bath comprising 33 ounces per gallon of chromic acid and 0.3 ounce per gallon of sulfate, using a current density of about 2 amperes per square inch. The elements of the assembly were next degreased and then clamped together in assembled relation. The clamped assembly, having a total thickness of about 0.750 inch, was then moved to a chamber wherein the welding of the titanium elements was performed under an inert atmosphere of argon. Following the welding operation, the welded assemblies were annealed in argon for four hours at a temperature of about 900° C. In preparation for rolling, the assemblies were rapidly heated in air to approximately 1150° C. The rolling operation was carried out using light reductions of approximately 0.045 inch per pass with frequent intermediate re-heats. The composite assembly was reduced by the rolling from 0.750 inch to 0.125 inch, a reduction of over 83%. The composite member was air cooled after rolling.

The titanium clad member made by this method was metallurgically bonded at all of the titanium-stainless steel interfaces and the bond did not break under flexure or cold deformation. By comparison, a similar assembly reduced from 0.750 to 0.500 inch, a 33% reduction, showed poor bonding and the sheets separated on cold deformation. At 67% reduction, bonding occurred at over 80% of the area of the interfaces.

In the described method, the purpose of the chromium plating on the stainless steel plate is to provide a barrier layer to prevent the formation of low melting eutectic and brittle intermetallic compounds between the iron or nickel of the stainless steel and the titanium during subsequent heating and forming operations. These objectionable alloys and compounds will form at the rolling temperatures used (from 930° C. to 1200° C.) if a physical barrier is not interposed between the stainless steel and the titanium during the operations at these temperatures. The chromium provides this physical barrier. The careful machining of the elements described is necessary to provide a close fit of the parts so that substantially no gas will be trapped in the sealed assembly. The welding operation is carried out under an inert atmosphere such as argon or helium to prevent the formation of oxides on the mating surfaces.

Although the amount of oxide on the titanium was held to a minimum by using the cleaning and assembly techniques that have been outlined, a thin film of titanium oxide is nevertheless present on the mating surfaces. The purpose of the annealing treatment at 900° C. was to remove the oxide from the surface of the titanium. In the removal of this film by heating in an inert atmosphere, advantage is taken of the high solubility of oxygen in titanium. If the temperature is sufficiently high, the oxygen from the oxide of the film will diffuse into the titanium and thereby be rendered harmless. A temperature of 900° C. is high enough to cause rapid diffusion of oxygen into the titanium, but it is lower than the temperature at which eutectic reactions between the elements of the stainless steel and the titanium will occur.

Heating to the rolling temperature of 1150° C. was carried out rapidly to prevent diffusion of the elements of the stainless steel and titanium through the chromium barrier layer and thus to eliminate the resultant eutectic reactions. A rolling temperature of 1150° C. (which is above the cold working range) enables adequate hot reduction of the stainless steel, the titanium and the chromium barrier layer.

According to the present invention, a method has been presented for producing the titanium clad member, in which the titanium is metallurgically bonded to the stainless steel through a thin intermediate chromium layer. The bond between the titanium and stainless steel will withstand both hot and cold deformation and exhibits good heat transfer properties. In short, the quality of the bonding disclosed herein was hitherto unattainable in the art.

The method disclosed is suitable for bonding titanium to alloys containing the iron group metals of group VIII of the periodic table, namely; alloys containing nickel, iron and cobalt as the major constituents. It is obvious that other changes may be made in the method disclosed without departing from the teaching of this invention.

In general, it will be understood that the above specification and drawings are exemplary and not limiting.

I claim as my invention:

1. A process for making a strong, corrosion resistant composite member comprising an austenitic stainless steel base plate and a titanium cladding plate integrally and continuously metallurgically bonded together in face-to-face arrangement, including the steps of, applying to said ferrous base plate at least 0.0005 inch of chromium to form a continuous barrier layer thereon, applying to the surface of said ferrous base plate a titanium cladding plate, annealing the composite assembly at about 900° C. in an inert atmosphere to remove oxide from the bonding surface of said titanium plate, heating said assembly rapidly to a temperature of approximately 1150° C., hot rolling said assembly to provide a reduction in thickness of at least 70% and thereafter, cooling the resulting composite member.

2. A process for making a strong, corrosion resistant composite member comprising an austenitic stainless steel base plate and a titanium cladding plate integrally and continuously bonded together in face-to-face arrangement, including the steps of, plating said stainless steel base plate with chromium to form a continuous barrier layer thereon having a thickness of from .0005 to .005 inch, securing said chromium plated base plate and said titanium plate into a sealed assembly having close fitting engagement to minimize gas entrapment therebetween, annealing said composite assembly at about 900° C. for four hours in an inert atmosphere to remove oxide from the bonding surface of said titanium plate, heating said member rapidly to a temperature of approximately 1150° C., hot rolling said member in a plurality of passes to provide a total reduction of at least 70% with intermediate reheating between rolling passes, and thereafter cooling said member in air.

3. A process for making a strong, corrosion resistant composite member comprising an austenitic stainless steel base plate completely enclosed within a titanium cladding layer integrally and continuously bonded to it, including the steps of, plating said stainless steel base plate with at least .0005 inch of chromium to form a continuous barrier layer thereon, clamping a plurality of titanium cladding elements to said stainless steel base plate to completely enclose said plate, welding said titanium elements together in an inert atmosphere to form a composite gas-tight member, annealing said composite member at about 900° C. in an inert atmosphere to remove oxide from the bonding surfaces of said titanium elements, heating said composite member rapidly to a temperature of approximately 1150° C., rolling said member in a plurality of passes to provide a reduction of at least 70% to bond the titanium to the stainless steel base through the chromium barrier layer, and thereafter, cooling said member in air.

4. A process for making a strong, corrosion resistant composite member comprising an austenitic stainless steel base plate and a layer of titanium cladding integrally and continuously bonded together, including the steps of plating said stainless steel base plate with chromium to form a continuous barrier layer thereon having a depth of approximately .002 inch chromium, clamping a plurality of titanium cladding elements securely to said stainless steel base plate to completely enclose said base plate and minimize gas entrapment therebetween, welding said titanium elements about said base plate in an inert atmosphere to form a sealed composite member having a thickness of approximately 0.750 inch, annealing said member at about 900° C. for about four hours in an inert atmosphere to remove oxide from the bonding surface of said titanium elements, heating said assembled member rapidly to a temperature of approximately 1150° C., rolling said member with .045 inch reduction per pass to a total reduction of at least 75% and reheating said member between rolling operations, and thereafter cooling said member in air.

References Cited in the file of this patent

UNITED STATES PATENTS

| | | |
|---|---|---|
| 986,645 | Rossi | Mar. 14, 1911 |
| 1,940,850 | Derby | Dec. 26, 1933 |
| 2,032,926 | Ford | Mar. 3, 1936 |
| 2,473,712 | Kinney | June 21, 1949 |
| 2,813,332 | Keay | Nov. 19, 1957 |
| 2,859,158 | Schaer | Nov. 4, 1958 |
| 2,908,969 | Wagner | Oct. 20, 1959 |